United States Patent
Lee et al.

(10) Patent No.: US 10,190,192 B2
(45) Date of Patent: Jan. 29, 2019

(54) METHOD OF RECOVERING ACID AND PLATINUM GROUP METAL FROM LEACHING SOLUTION OF SPENT CATALYST

(71) Applicant: KOREA INSTITUTE OF GEOSCIENCE AND MINERAL RESOURCES, Daejeon (KR)

(72) Inventors: Jin-Young Lee, Daejeon (KR); Kyeong-Woo Chung, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 625 days.

(21) Appl. No.: 14/787,925

(22) PCT Filed: Apr. 28, 2014

(86) PCT No.: PCT/KR2014/003723
§ 371 (c)(1),
(2) Date: Oct. 29, 2015

(87) PCT Pub. No.: WO2014/178586
PCT Pub. Date: Nov. 6, 2014

(65) Prior Publication Data
US 2016/0102384 A1    Apr. 14, 2016

(30) Foreign Application Priority Data
Apr. 29, 2013    (KR) .................... 10-2013-0047625

(51) Int. Cl.
C22B 3/10    (2006.01)
C22B 3/00    (2006.01)
C22B 3/44    (2006.01)
C22B 3/22    (2006.01)
C22B 3/46    (2006.01)
C22B 7/00    (2006.01)

(52) U.S. Cl.
CPC .............. *C22B 11/048* (2013.01); *C22B 3/10* (2013.01); *C22B 3/22* (2013.01); *C22B 3/44* (2013.01);
(Continued)

(58) Field of Classification Search
None
See application file for complete search history.

(56) References Cited

U.S. PATENT DOCUMENTS 7,972,412 B2    7/2011    Bergeron et al.

FOREIGN PATENT DOCUMENTS

JP    S5212619 A    1/1977
JP    55-8572 A    1/1980
(Continued)

OTHER PUBLICATIONS

Japan Office action issued in JP2016-511673, dated Oct. 18, 2016 with English translation, 4 pages.
(Continued)

*Primary Examiner* — Sheng H Davis
(74) *Attorney, Agent, or Firm* — Lewis Roca Rothgerber Christie LLP

(57) ABSTRACT

The present invention relates to a method of recovering acid and a platinum group metal from a leaching solution of a spent catalyst, more particularly, to a method of recovering acid and a platinum group metal from a leaching solution of a spent catalyst, the method including: filtering a leaching solution of a spent catalyst, providing the filtered leaching solution into a concentration chamber, and heating the filtered leaching solution to recover acid included in the leaching solution; providing a concentrated solution of the leaching solution into a substitution chamber after recovering the acid, and adding a metal for a substitution reaction; and cleaning a solid, which is separated by solid-liquid (Continued)

separation after the substitution reaction, with acid and recovering the platinum group metal.

11 Claims, 2 Drawing Sheets

(52) U.S. Cl.
CPC ............... *C22B 3/46* (2013.01); *C22B 7/007* (2013.01); *Y02P 10/214* (2015.11); *Y02P 10/234* (2015.11)

(56) References Cited

FOREIGN PATENT DOCUMENTS

| | | |
|---|---|---|
| JP | S558572 A | 1/1980 |
| JP | H0543203 A | 2/1993 |
| JP | 5-43203 B2 | 7/1993 |
| JP | 08-176692 | 7/1996 |
| JP | H08209259 A | 8/1996 |
| KR | 10-0858551 | 9/2008 |
| KR | 10-0888040 | 3/2009 |
| KR | 10-2010-0124030 | 11/2010 |
| WO | WO2011/132740 A1 | 10/2011 |

OTHER PUBLICATIONS

Supplemental European Search Report for Application No. 14791431.1, dated Jan. 25, 2017, 5 pages.
Japanese Office action with English translation for Application No. 2016-511673, dated Jan. 31, 2017, 6 pages.
International Search Report corresponding to PCT/KR2014/003723, dated Aug. 6, 2014, 2 pages.

[Fig. 1]
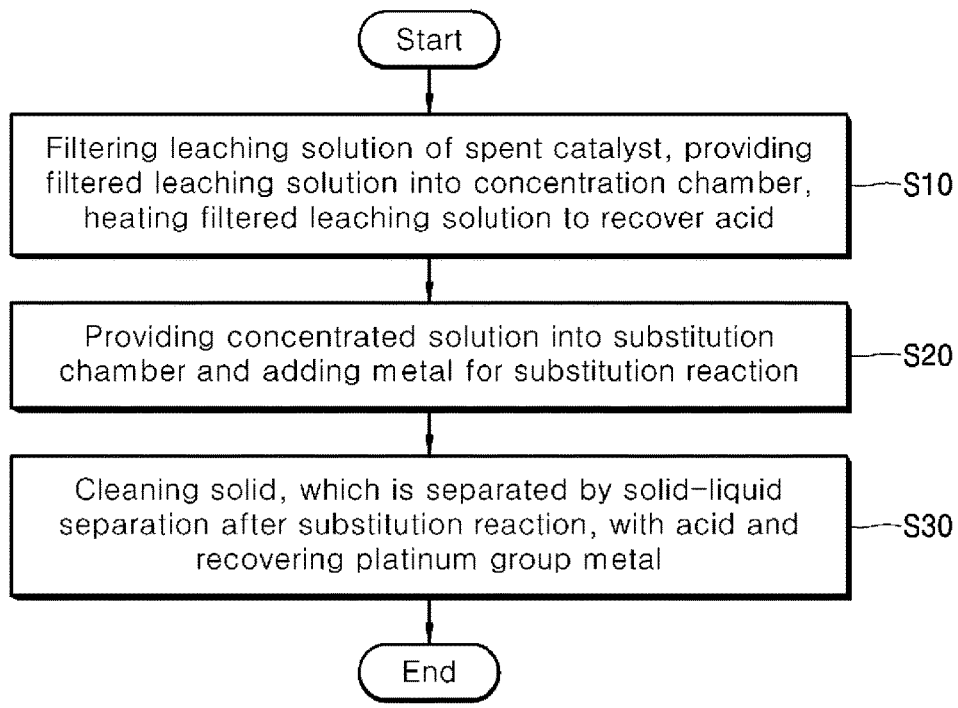

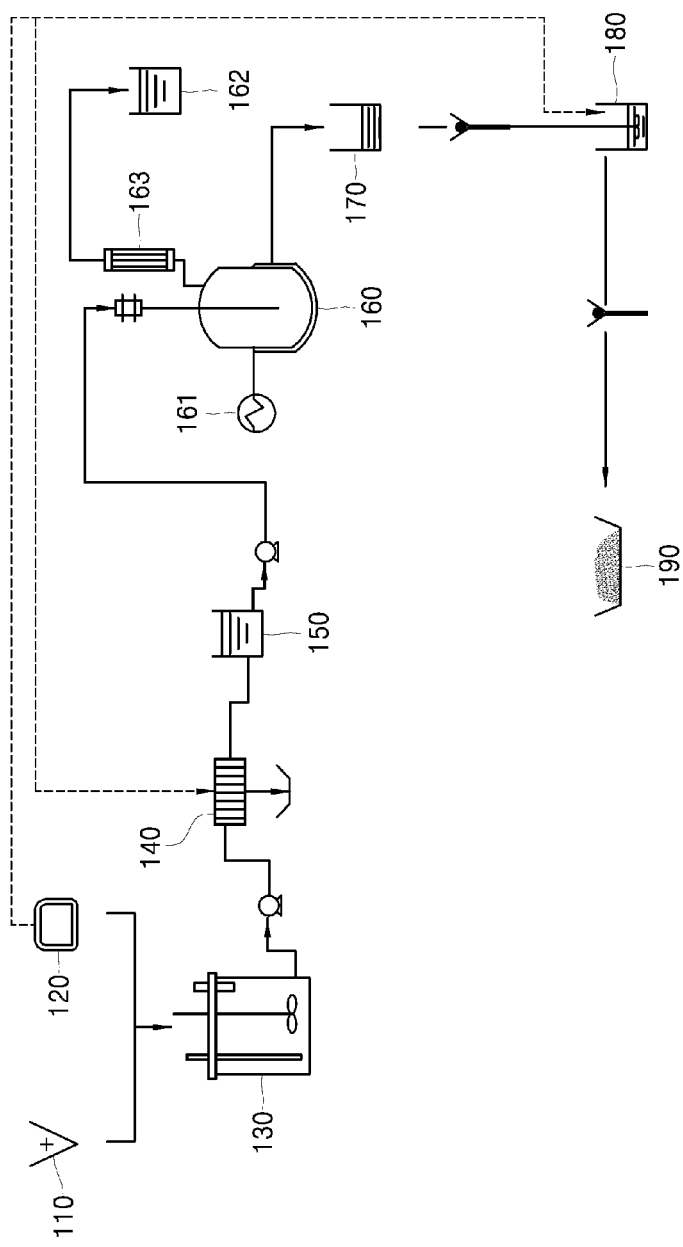
[Fig. 2]

METHOD OF RECOVERING ACID AND PLATINUM GROUP METAL FROM LEACHING SOLUTION OF SPENT CATALYST

CROSS-REFERENCED TO RELATED APPLICATION(S)

This Application is a National Phase Patent Application and claims priority to and the benefit of International Application Number PCT/KR2014/003723, filed on Apr. 28, 2014, which claims priority to and the benefit of Korean Application 102013-0047625, filed Apr. 29, 2013, the entire contents of all of which are incorporated herein by reference.

TECHNICAL FIELD

The present invention relates to a method of recovering acid and a platinum group metal from a leaching solution of a spent catalyst.

BACKGROUND ART

Platinum group metals have excellent electrical, chemical and physical properties, occupy an important position for not only in typical jewel industries, but also as electronic industry materials, and its demand is increasing. In addition, its chemical property at high temperatures is stable, so the platinum group metals are widely used for aerospace materials and petrochemical and automobile catalysts, and are widely used industrially and commercially in electrical and medical industries requiring corrosion resistance.

Further, as the demand increases, the amount of industrial waste such as wasted electronic device scraps, petrochemical spent catalysts, automobile spent catalysts, etc. being generated is rapidly increasing, and highly priced precious metals such as gold, silver, palladium, rhodium, etc. and various valuable metals such as copper are included in the waste, so the waste may be a secondary resource. In this case, when the platinum group metals are recovered in a high recovery rate by using the spent catalysts, which are not processed and wasted, the material may realize high value addition and may be used as core technology for technological development, and may be used as a material for high purity rare metals and platinum group elements as well as catalysts.

In the case of the platinum group metals used for this usage, the mineral resource is scarce and the endowed area is concentrated, so the price is high and the entire quantity is imported, thus a method of recovering platinum group metals from spent catalysts, which include the platinum group metals, is demanded.

As a related art, a method of recovering platinum group metals by leaching rhodium, platinum and palladium, which are platinum group metals included in alumina carriers, by using aqua regia, has been proposed, however, platinum and palladium may be leached by aqua regia but rhodium is not leached at all, and the cost of processing the discharged waste from this process is high.

As a related document, a method of leaching platinum group metals from automobile spent catalysts is disclosed in Korean Unexamined Patent Publication No. 10-2010-0124030 (published on Nov. 26, 2010).

DISCLOSURE

Technical Problem

Therefore, an object of the present invention is to provide a method of additionally recovering platinum group metals and recovering used acid from a leaching solution, which is leached for recovering platinum group metals of catalysts used in automobile exhaust gas purification or petrochemical process.

Objects of the present invention may not be limited to the above objects, and other objects will be clearly understandable to those having ordinary skill in the art from the disclosures provided below.

Technical Solution

To achieve the object, the present invention provides a method of recovering acid and a platinum group metal from a leaching solution of a spent catalyst, the method including: filtering a leaching solution, in which a spent catalyst is leached, providing the filtered leaching solution into a concentration chamber, and heating the filtered leaching solution to recover acid included in the leaching solution; providing a concentrated solution of the leaching solution into a substitution chamber after recovering the acid, and adding a metal for a substitution reaction, and cleaning a solid, which is separated by solid-liquid separation after recovering the acid, with the acid and recovering the solid.

The spent catalyst may be leached in 3 M to 12 M of hydrochloric acid (HCl).

The filtered leached solution may be heated at 90° C. to 180° C.

When the acid is recovered, a concentration of the acid may be 13 M when 1% to 10% of the acid is recovered, the concentration of the acid may be 9.7 M when 10% to 20% of the acid is recovered, the concentration of the acid may be 6.4 M when 20% to 40% of the acid is recovered, the concentration of the acid may be 5.95 M when 40% to 60% of the acid is recovered, and the concentration of the acid may be 5.5 M when 60% to 80% of the acid is recovered.

When the substitution reaction is performed, an acid density of the concentration solution may be 0.05 M to 1 M.

The metal added when the substitution reaction is performed may include one or more metals selected from the group consisting of iron, aluminum and zinc, and the metal added to the concentration solution may be 3 to 10 times of the platinum group metal included in the concentration solution based on an equivalence ratio.

The substitution reaction may be performed at 20° C. to 80° C.

The acid used for cleaning the solid separated by the solid-liquid separation may include one or more acid selected from the group consisting of hydrochloric acid, nitric acid and sulfuric acid, and the concentration of the acid may be 0.1 M to 10 M.

The platinum group metal may include one or more metal selected from the group consisting of platinum (Pt), palladium (Pd) and rhodium (Rh).

In addition, the recovered acid may be reused in a leaching process, a filtering process and a cleaning process.

Advantageous Effects

According to the present invention, not only platinum (Pt) and palladium (Pd), but also rhodium (Rh) remaining in the leaching solution of the spent catalyst used in the automobile exhaust gas purification process or the petrochemical process may be recovered at a high recovery rate, and the acid used for leaching the platinum group metals may be recovered at each concentration, so that the size of the platinum group metal recovery process after the leaching may be reduced and the recovered acid may be reused in the leaching process, the filtering process and the cleaning process, thus energy may be conserved, cost may be reduced, and a recovery method harmless to the environment may be provided.

DESCRIPTION OF DRAWINGS

FIG. 1 is a flow chart showing a method of recovering acid and platinum group metals from a platinum group metal spent catalyst leaching solution according to the present invention.

FIG. 2 is a process diagram showing a method of recovering acid and platinum group metals from a platinum group metal spent catalyst leaching solution according to the present invention.

BEST MODE

Hereinafter, exemplary embodiment according to the present invention is described in detail with reference to the accompanying drawings.

Advantages and features of the present invention, and method for achieving thereof will be apparent with reference to the examples that follow.

However, it should be understood that the present invention is not limited to the following embodiments and may be embodied in different ways, and that the embodiments are given to provide complete disclosure of the invention and to provide thorough understanding of the invention to those skilled in the art, and the scope of the invention is limited only by the accompanying claims and equivalents thereof.

In addition, when describing embodiments of the present invention, detailed descriptions of well-known functions and structures incorporated herein may be omitted when they make the subject matter of the present invention unclear.

The present invention provides a method of recovering acid and a platinum group metal from a leaching solution of a spent catalyst, the method including: filtering a leaching solution, in which a spent catalyst is leached, providing the filtered leaching solution into a concentration chamber, and heating the filtered leaching solution to recover acid included in the leaching solution; providing a concentrated solution of the leaching solution into a substitution chamber after recovering the acid, and adding a metal for a substitution reaction; and cleaning a solid, which is separated by solid-liquid separation after recovering the acid, with the acid and recovering the platinum group metal.

FIG. 1 is a flow chart showing a method of recovering acid and platinum group metals from a leaching solution of a spent catalyst according to the present invention.

Hereinafter, the method of recovering acid and platinum group metals from a leaching solution of a spent catalyst according to the present invention is described in detail in reference to FIG. 1.

The method of recovering acid and platinum group metals from a leaching solution of a spent catalyst according to the present invention includes filtering a leaching solution, in which a spent catalyst is leached, providing the filtered leaching solution into a concentration chamber, heating the filtered leaching solution to recover acid included in the leaching solution (S10).

The spent catalyst may be a spent catalyst wasted after being used as an exhaust gas purification catalyst, or a spent catalyst used in a petrochemical process, in which platinum (Pt) and palladium (Pd), rhodium (Rh), etc., which are platinum group elements, are included in an alumina carrier.

The spent catalyst is mixed with the acid in the leaching chamber and leached. More specifically, after grinding the spent catalyst, the spent catalyst is mixed with hydrochloric acid (HCl) of 3 M to 12 M to leach the platinum group element. The leaching solution passes through a filtering process, provided into a concentration chamber and heated to recover the acid included in the leaching solution.

The filtering process may be performed by various methods such as filter pressing, centrifuging, natural filtering, etc., and the filtering process is not limited thereto when the method can remove the solid existing in the leaching solution.

The filtered leaching solution is provide into a concentration chamber and heated, in which the heating temperature is preferably 90° C. to 180° C. When the heating temperature is less than 90° C., the recovery speed of the acid becomes very slow, and when exceeding 180° C., excessive energy is consumed and components may be damaged.

The acid is recovered according to the concentration of the acid through the heating process of the concentration chamber. Specifically, in the present invention, when the acid is recovered, a concentration of the acid is 13 M when 1% to 10% of the acid is recovered, the concentration of the acid is 9.7 M when 10% to 20% of the acid is recovered, the concentration of the acid is 6.4 M when 20% to 40% of the acid is recovered, the concentration of the acid is 5.95 M when 40% to 60% of the acid is recovered, and the concentration of the acid is 5.5 M when 60% to 80% of the acid is recovered.

The method of recovering acid and platinum group metals from a leaching solution of a spent catalyst according to the present invention includes providing a concentrated solution of the leaching solution into a substitution chamber after recovering the acid and adding metal for a substitution reaction (S20).

In this case, the acid concentration of the concentrated solution during the substitution reaction is preferably 0.05 M to 1 M. When the acid concentration is less than 0.05 M, the substitution speed is low, and when the acid concentration exceeds 1 M, unnecessary consumption of the metal occur.

In addition, the metal added during the substitution reaction has a higher ionization tendency than a platinum group metal, specifically, the metal may include a metal selected from the group of iron, aluminum and zinc, and the metal of 3 to 10 times the equivalence ratio of the platinum group metal included in the concentrated solution is preferably added.

The substitution reaction may be performed at 20° C. to 80° C. When the substitution reaction is performed at less than 20° C., the substitution reaction speed is low, and when exceeding 80° C., excessive energy is consumed.

The method of recovering acid and platinum group metals from a leaching solution of a spent catalyst according to the present invention includes cleaning a solid, which is separated by solid-liquid separation after the substitution reaction, with acid and recovering the platinum group metal (S30).

The solid, which is separated by solid-liquid separation after the substitution reaction, includes platinum (Pt), palladium (Pd) and rhodium (Rh), and the solid, which is separate by the solid-liquid separation, may be cleaned by acid such as hydrochloric acid, nitric acid and sulfuric acid. The concentration of the acid is preferably 0.1 M to 10 M. When the concentration of the acid is less than 0.1 M, the impurity removal rate of the metal other than the platinum group metal is low, and when exceeding 10 M, excessive acid is consumed.

Because the solid cleaned by the acid includes the acid, the solid including the acid is again subject to the solid-liquid separation to recover the solid. The separated solid includes platinum (Pt) and palladium (Pd), and also 98% to 99% of rhodium (Rh), so, by using the recovery method according to the present invention, the residual platinum group metal remaining in the leaching solution may be recovered at a high recovery rate.

In the method of recovering acid and a platinum group metal from a leaching solution of a spent catalyst according to the present invention, platinum (Pt), palladium (Pd) and rhodium (Rh) remaining in the leaching solution of the spent catalyst used by a large amount in the automobile exhaust gas purification process or the petrochemical process may be recovered at a high recovery rate, and the acid may be recovered in the concentration chamber, so that the recovered acid may be reused in the leaching process, the filtering process and the cleaning process, so the method may be usefully employed for recovering the platinum group metal from the large amount of the spent catalyst.

[Mode for Invention]

Embodiment 1: Recovering acid and platinum group metals from spent catalyst leaching solution Step of filtering a leaching solution, in which a spent catalyst is leached, providing the filtered leaching solution into a concentration chamber, heating the filtered leaching solution to recover acid included in the leaching solution:

FIG. 2 is a process diagram showing a method of recovering acid and platinum group metals from a leaching solution of a spent catalyst according to the present invention.

Referring the FIG. 2, after grinding the spent catalyst 110 used in the automobile exhaust gas purification process or the petrochemical process, the spent catalyst is mixed with HCl 120 of 3 M to 12 M in the leaching chamber 130 to leach the platinum group element included in the spent catalyst for 1 to 5 hours at room temperature. The leaching rate of the platinum group metal was 99.9% for platinum (Pt), 99.9% for palladium (Pd) and 50.3% for rhodium (Rh). The leaching solution was filtered by the filtering process 140 and transferred to a leaching solution tank 150. 780 g of Pt, 87.4 g of Pd and 93.6 g of Rh existed in the leaching solution tank 150 and the amount of the leaching solution was 3120 L. The leaching solution was provided in the concentration chamber 160, and the acid was recovered from the acid recovering chamber 162 by heating the concentration chamber to 90 to 180° C. by a boiler 161. The acid evaporated in the concentration chamber 160 was recovered to a solution by a liquefying device 163. When the acid was recovered, a concentration of the acid was 13 M when 1% to 10% of the acid was recovered, the concentration of the acid was 9.7 M when 10% to 20% of the acid was recovered, the concentration of the acid was 6.4 M when 20% to 40% of the acid was recovered, the concentration of the acid was 5.95 M when 40% to 60% of the acid was recovered, and the concentration of the acid was 5.5 M when 60% to 80% of the acid was recovered.

Step of providing a concentrated solution of the leaching solution into a substitution chamber after recovering the acid and adding a metal for a substitution reaction:

After the acid was recovered, the amount of the leaching solution in the concentration chamber 160 was 300 L, and the amount of Pt, Pd and Rh was the same as the amount measured in the leaching solution tank 150. The concentration solution remaining in the concentration chamber 160 was provided in the substitution chamber 170, the metal having an ionization tendency higher than the platinum group metal, in other words, iron, aluminum, zinc, etc. of 3 to 10 times the equivalence ratio of the platinum group metal included in the concentration solution was added and substitution reaction was performed. In this case, the acid concentration of the concentration solution was adjusted to 0.05 M to 1 M, and the substitution reaction was performed at 40° C.

Steps of solid-liquid separating the solution after the substitution reaction, and recovering the solid after cleaning a separated solid with acid:

The solid, which was separated by solid-liquid separation after the substitution reaction, includes platinum (Pt), palladium (Pd) and rhodium (Rh), and the solid was provided in an acid cleaning chamber 180 and cleaned by acid such as hydrochloric acid, nitric acid and sulfuric acid. The concentration of the acid was 0.1 M to 10 M. The cleaned solid was solid-liquid separated and recovered 190, and the amount of the recovered platinum (Pt), palladium (Pd) and rhodium (Rh) was 98% to 99%.

While the method of recovering acid and a platinum group metal from a leaching solution of a spent catalyst according to the present invention has been particularly shown and described with reference to various embodiments thereof, it will be understood by those of ordinary skill in the art that various substitutions, changes in form and alterations may be made therein without departing from the spirit and the scope of the present invention Therefore, the scope of the present invention is not limited to the described embodiments, but is limited only by the accompanying claims and equivalents thereof, and any alterations equivalent to the accompanying claims are within the scope of the present invention.

That is, the described embodiments are completely for a description, and it should not be interpreted in any way to limit the scope of the present invention. The scope of the present invention is only defined by within the scope of the accompanying claims, and all various substitutions, changes in form and alterations derived from the meaning, scope and equivalents are within the scope of the present invention.

The invention claimed is:

1. A method of recovering acid and a platinum group metal from a leaching solution of a spent catalyst, the method comprising:

filtering a leaching solution, in which a spent catalyst is leached, providing the filtered leaching solution into a concentration chamber, and heating the filtered leaching solution to recover acid included in the leaching solution;

providing a concentrated solution of the leaching solution into a substitution chamber after recovering the acid, and adding a metal having a higher ionization tendency than a platinum group metal for a substitution reaction; and cleaning a solid, which is separated by solid-liquid separation after the substitution reaction, with acid and recovering the solid, wherein the metal added when the substitution reaction is performed includes at least one selected from the group consisting of iron, aluminum and zinc.

2. The method according to claim 1, wherein the spent catalyst is leached in 3 M to 12 M of hydrochloric acid (HCl).

3. The method according to claim 1, wherein the filtered leached solution is heated at 90° C. to 180° C.

4. The method according to claim 1, wherein, when the acid is recovered, a concentration of the acid is 13 M when 1% to 10% of the acid is recovered, the concentration of the acid is 9.7 M when 10% to 20% of the acid is recovered, the concentration of the acid is 6.4 M when 20% to 40% of the acid is recovered, the concentration of the acid is 5.95 M when 40% to 60% of the acid is recovered, and the concentration of the acid is 5.5 M when 60% to 80% of the acid is recovered.

5. The method according to claim 1, wherein, when the substitution reaction is performed, an acid density of the concentration solution is 0.05 M to 1 M.

6. The method according to claim 1, wherein the metal added to the concentration solution is 3 to 10 times of the platinum group metal included in the concentration solution based on an equivalence ratio.

7. The method according to claim 1, wherein the substitution reaction is performed at 20° C. to 80° C.

8. The method according to claim 1, wherein the acid used for cleaning the solid separated by the solid-liquid separation includes at least one selected from the group consisting of hydrochloric acid, nitric acid and sulfuric acid.

9. The method according to claim 8, wherein a concentration of the acid is 0.1 M to 10 M.

10. The method according to claim 1, wherein the platinum group metal includes at least one selected from the group consisting of platinum (Pt), palladium (Pd) and rhodium (Rh).

11. The method according to claim 1, wherein the recovered acid is reused in a leaching process, a filtering process and a cleaning process.

\* \* \* \* \*